(12) United States Patent
Yeluripati et al.

(10) Patent No.: US 12,463,726 B2
(45) Date of Patent: Nov. 4, 2025

(54) SYSTEM AND METHOD FOR ENABLING OPTICAL CHANNELS FOR HIGH-SPEED COMMUNICATION

(71) Applicant: Lightspeed Photonics Private Limited, Hyderabad (IN)

(72) Inventors: Rohin Kumar Yeluripati, Ramachandrapuram (IN); Venkata Ramana Pamidighantam, Hyderabad (IN)

(73) Assignee: Lightspeed Photonics Private Limited, Hyderabad (IN)

( * ) Notice: Subject to any disclaimer, the term of this patent is extended or adjusted under 35 U.S.C. 154(b) by 309 days.

(21) Appl. No.: 18/256,900

(22) PCT Filed: Dec. 9, 2021

(86) PCT No.: PCT/IN2021/051157
§ 371 (c)(1),
(2) Date: Jun. 9, 2023

(87) PCT Pub. No.: WO2022/123604
PCT Pub. Date: Jun. 16, 2022

(65) Prior Publication Data
US 2024/0031031 A1    Jan. 25, 2024

(30) Foreign Application Priority Data
Dec. 10, 2020   (IN) ............................. 202041053755

(51) Int. Cl.
*H04B 10/40*    (2013.01)
(52) U.S. Cl.
CPC .................................... *H04B 10/40* (2013.01)
(58) Field of Classification Search
CPC ...... H04B 10/40; H04B 10/27; H04B 10/503; H04B 10/502; H04B 10/272;
(Continued)

(56) References Cited

U.S. PATENT DOCUMENTS

| | | | |
|---|---|---|---|
| 2002/0126340 A1* | 9/2002 | Nikiforov | H04B 10/11 398/118 |
| 2021/0356724 A1* | 11/2021 | Semenov | G01J 9/02 |
| 2022/0166519 A1* | 5/2022 | Lee | H04J 14/0227 |

FOREIGN PATENT DOCUMENTS

| | | |
|---|---|---|
| CN | 109100836 A | 12/2018 |
| CN | 210347999 U | 4/2020 |

OTHER PUBLICATIONS

International Search Report and Written Opinion received for International Patent Application No. PCT/IN2021/051157, issued on Mar. 8, 2022, 9 pages.

(Continued)

*Primary Examiner* — Hibret A Woldekidan
(74) *Attorney, Agent, or Firm* — Barta Jones, PLLC (57) ABSTRACT

Provided are a system and method for enabling optical channels for high-speed communication. The problem of insufficient data transmission/reception rate has been solved by using one or more optical channels which may be an optical transmission and reception system or a transceiving apparatus disclosed and described in present invention. The optical transmission and reception system may comprise at least one transmission apparatus and at least one reception apparatus. The at least one transmission apparatus is configured to receive at least one optical signal from a first system. The transmission apparatus generates and transmits one or more path signals based on the received one or more optical signals. The generated one or more path signal is received by a reception apparatus associated with a second system.

15 Claims, 7 Drawing Sheets

(58) Field of Classification Search
CPC ......... H04J 14/0216; G02B 6/34; G02B 6/32; G02B 6/305; G02B 26/105; G02B 6/4246; G02B 6/4255; G02B 6/4214
See application file for complete search history.

(56) References Cited

OTHER PUBLICATIONS

Kobayashi, Takayuki, et al., "Ultrahigh-speed Optical Communications Technology Combining Digital Signal Processing and Circuit Technology", Feature Articles, NTT Technical Review, vol. 17, No. 05, May 2019, pp. 12-19.

* cited by examiner

SYSTEM AND METHOD FOR ENABLING OPTICAL CHANNELS FOR HIGH-SPEED COMMUNICATION

CROSS REFERENCE TO RELATED PATENT APPLICATIONS

This application is a U.S. National Phase of International Patent Application No. PCT/IN2021/051157 filed on Dec. 9, 2021, which claims the priority to and benefit of Indian Provisional Patent Application No. 202041053755 filed on Dec. 10, 2020. Each of the above-referenced applications is hereby incorporated herein by reference in its entirety.

FIELD OF THE INVENTION

The present invention relates to communication technology domain. More specifically, the invention relates to systems and methods for enabling optical channels for high-speed communication.

BACKGROUND OF THE INVENTION

Higher integration has become a trend in modem electronic packaging. One of the major challenges is to improve the thermo mechanical reliability when the package is subjected to thermal loads. However, the conjunct interfaces near the free edge always suffer high stress gradients and even can generate cracks, because the packaging components are fabricated with different thermal and mechanical properties.

Traditionally, chip manufacturers connect two monolithic central processing units (CPUs) together in a multichip module (MCM). An MCM is a package with pins where multiple integrated circuits, or chips (ICs), semiconductor dies, and/or other components are integrated. This is usually done on a unifying substrate, so when the MCM is in use it can be treated as if it were one large chip. An MCM is sometimes referred to as a hybrid IC. Chiplets are the individual ICs that make up an MCM. They provide a way to minimize the challenges of building with cutting-edge transistor technology. In recent days the chiplet technology largely applied to scale beyond moore's law.

Currently, manufactures manage power consumption and thermal issues in multicore devices by throttling the processing clock frequency of the multiple processor cores. Throttling the processing clock frequency of multiple processor cores of the multi-core devices can help manage power consumption and thermal issues by reducing the rate of work accomplished by the multi-core processors. However, this technique focuses on managing these issues at the expense of performance.

Further, it is highly desirable to provide improved computer architectures and methods for providing and using such architectures that provide sufficient speed performance in large scale parallel processing data centers, while maintaining or reducing their power consumption. Such architectures should allow conventional software and operating systems to be employed where possible so that serial tasks are still available, but those tasks involving parallel operations can be achieved at significantly increased performance thereby reducing the burden to employ more numerous, and more powerful processors to expand capacity.

Eventually, when the system has ability to process significant load of data, the system needs to be provided with adequate data at a required rate. In traditional systems, numbers of instructions executed by the processor will be proportional to the rate at which data is received. In such cases scheduling algorithms associated with operating systems will be able to enable effective resource utilization. When the system has capacity to execute instructions at an improved rate, and if the instructions to be executed are not fetched at the required rate, it would affect resource utilization cycle of the system.

Further, in case of re-configuring the servers in a data center or/and in upgrading the data center infrastructure, procurement and deployment of resources is always a hectic process both in terms of technical as well as amount of manual work involved.

Hence, there is a need for a communication system which is designed for high performance computing applications. For efficient enablement of the system there is a need for utilizing multiple technologies along with packaging methodologies. Further, to supplement the systems which are designed for high performance computing applications, there is a need for developing a high data rate communication mechanism both for inter-system communication and intra-system communication with thermal stability.

OBJECT OF THE INVENTION

The principal object of the invention is to provide a system and method for enabling optical channels for high-speed communication. The objective is to enable a system and a method that establishes a communication through one or more optical channels.

Another object of the invention relates to methods and system that enables ultra-high speed multiple lane connections of multiple Gb/s per lane between components of a system.

In one objective, the invention provides a novel optical transmission and reception system (optical channel).

In another objective, the invention provides a method for enabling an optical transmission and reception system (optical channel).

The above said system and method of optical channels are used in signal communication between two or more compute systems communicatively connected in a computing environment. The system and method in the optical channel involve a "transmission apparatus" configured to receive at least one optical signal from at least one first compute system, which is then converted into one or more path signals using one side of the transmission apparatus, which path signals then travel to other sides of the said transmission apparatus, wherein one or more "reception apparatus" present on other sides of the transmission apparatus are configured to receive the transmitted path signals, which are then sent to associated at least one second compute system. Thus, optical communication is achieved among the plurality of compute systems via the optical transmission and reception system (optical channel system).

Another objective is to provide a system for enabling optical channels for highspeed communication, wherein the optical channel comprises a novel transceiving apparatus. Thus, a novel transceiving apparatus, and a method for the transceiving apparatus are provided.

These and other objects and characteristics of the present invention will become apparent from the further disclosure to be made in the detailed description given below.

SUMMARY OF THE INVENTION

This summary is provided to introduce a selection of concepts in a simplified form that are further described below in the detailed description. This summary is not intended to limit the scope of the present invention.

The problem of insufficient data transmission/reception rate has been solved by using one or more novel optical channels of the present invention. A system and method for enabling one or more optical channels is explained in the disclosure.

In one embodiment, the one or more "optical channels" (transmission and reception system) comprise at least one "transmission apparatus" and at least one "reception apparatus". The at least one transmission apparatus is configured to receive at least one optical signal from a first compute system. The transmission apparatus then generates and transmits one or more path signals based on the received one or more optical signals. The generated one or more path signal is received by a reception apparatus associated with a second compute system. In another embodiment, the one or more "optical channels" comprises a novel "transceiving apparatus".

A system for enabling optical channels for high-speed communication between compute systems in a computing environment, wherein each optical channel is an optical transmission and reception system, which comprises:
  (i) a transmission apparatus associated with one first compute system to obtain and transmit at least optical signal(s) sent from the first compute system; and
  (ii) a plurality of reception apparatus associated with another second compute system to receive the transmitted at least optical signal(s) sent from the said first compute system through the transmission apparatus.

The above system is characterized in that: the transmission apparatus includes: a first side, configured to receive at least one optical signal sent from the first compute system, wherein the received at least one optical signal is converted into one or more path signals using the first side of the transmission apparatus; a second side, configured to transmit the generated first path signal along a vertical plane in downwards direction of the transmission apparatus; a third side, configured to transmit the generated second path signal along a horizontal plane of the transmission apparatus; a fourth side, configured to transmit the generated third path signal along a vertical plane in upwards direction of the transmission apparatus.

The above system is characterized in that: the plurality of reception apparatus associated with the second compute system, are configured to receive the first path signal, the second path signal, and the third path signal respectively, generated and transmitted from the transmission apparatus associated with the first compute system.

The system for enabling optical channels as described above, wherein in the optical transmission and reception system, the plurality of reception apparatus comprises: the first reception apparatus which is configured to receive at a top portion, the first path signal which is transmitted along the vertical plane in downwards direction of the transmission apparatus.

The system for enabling optical channels as described above, wherein in the optical transmission and reception system, the plurality of reception apparatus comprises: the second reception apparatus which is configured to receive at a side portion, the transmitted second path signal, which is transmitted along the horizontal plane of the transmission apparatus.

The system for enabling optical channels as described above, wherein in the optical transmission and reception system, the plurality of reception apparatus comprises: the third reception apparatus which is configured to receive at a bottom portion, the third path signal, which is transmitted along the vertical plane in upwards direction of the transmission apparatus.

The invention further provides a system for enabling optical channels for high-speed communication between compute systems in a computing environment, wherein the optical channel is a transceiving apparatus.

The above said system involving transceiving apparatus is characterized in that: the transceiving apparatus comprises: a convergence or divergence area, wherein, the convergence or divergence area receives a first plurality of optical signals from a first compute system in a transmission mode, and wherein the convergence or divergence area receives a second plurality of optical signals to be transmitted to a second compute system in a reception mode; a first shift area, wherein, the first shift area transmits a first set of optical signals associated with the first plurality of optical signals along a vertical plane in upwards direction, in transmission mode, and wherein, the first shift area receives a second set of optical signals that is transmitted along a vertical plane in upwards direction and forms a part of the second plurality of optical signals, in reception mode; a second shift area, wherein, the second shift area transmits a third set of optical signals associated with the first plurality of optical signals along a horizontal plane, in transmission mode, and wherein, the second shift area receives a fourth set of optical signals that is transmitted along a horizontal plane and forms a part of the second plurality of optical signals, in reception mode; a third shift area, wherein, the third shift area transmits a fifth set of optical signals associated with the first plurality of optical signals along a vertical plane in downwards direction, in transmission mode, and wherein, the third shift area receives a sixth set of optical signals that is transmitted along the vertical plane in downwards direction and forms a part of the second plurality of optical signals, in reception mode.

The above said two systems for enabling optical channels, wherein the compute system in the computing environment comprises one or more modular compute systems, wherein each modular compute system comprises reconfigurable or programmable processor, wherein the optical channel connects one first modular compute system with another second compute system for transmission and reception of optical signals.

The above said two systems for enabling optical channels, wherein each compute system comprises one or more optical communication drivers connected with optical channel, wherein each optical communication drivers generates at least one optical signal from the associated one first modular compute system, which is transmitted via the respective optical channel to another second modular compute system.

The above said two systems for enabling optical channels, wherein,
  (i) the modular compute systems may be provided in a cluster system with horizontal interconnection of modular compute systems for enabling communication via optical channels in horizontal plane; or
  (ii) the modular compute systems may be provided in a stack formed by plurality of layers of the cluster of modular compute systems with vertical interconnection of compute systems between the layers for enabling communication via optical channels in the vertical plane.

Figure 5:
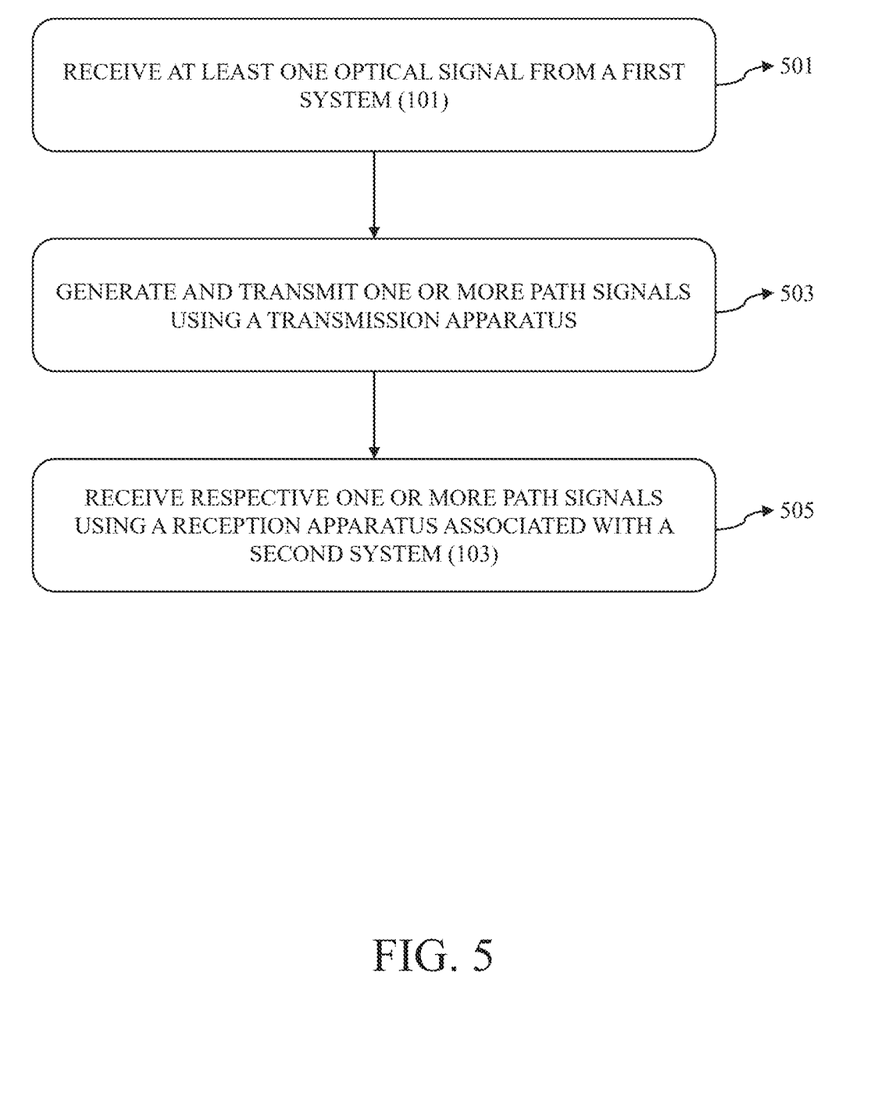
FIG. 5 illustrates an exemplary scenario for enabling optical channels for highspeed communication, according to one embodiment of the invention.

The invention provides a method for enabling optical channels for high-speed communication between compute systems in a computing environment, wherein the optical channel is an optical transmission and reception system, wherein the optical transmission and reception system, comprises:
- (i) a transmission apparatus associated with one first compute system to obtain and transmit at least optical signal(s) sent from the first compute system; and
- (ii) a plurality of reception apparatus associated with another second compute system to receive the transmitted at least optical signal(s) sent from the said first compute system through the transmission apparatus; wherein the method comprises the steps of: Step-501: obtaining at least one optical signal from a first compute system;

Step-503: generating one or more path signals associated with the at least one optical signal obtained from the first compute system; and transmitting the generated one or more path signal using a transmission apparatus; wherein the transmission apparatus includes, a first side, configured to receive at least one optical signal, wherein, the received at least one optical signal is converted into one or more path signal using the first side of the transmission apparatus; a second side, configured to transmit a first path signal along a vertical plane in downwards direction of the transmission apparatus; a third side, configured to transmit a second path signal along a horizontal plane of the transmission apparatus; and a fourth side, configured to transmit a third path signal along a vertical plane in upwards direction of the transmission apparatus; and Step-505: receiving one or more path signal using one or more reception apparatus respectively, associated with a second system; wherein, one or more reception apparatus, is/are configured to receive the first path signal, the second path signal, the third path signal respectively, which are transmitted from the transmission apparatus of the optical channel.

The above said method for enabling optical channels, wherein in the optical transmission and reception system, the plurality of reception apparatus comprises: the first reception apparatus which is configured to receive at a top portion, the first path signal which is transmitted along the vertical plane in downwards direction of the transmission apparatus. The above said method for enabling optical channels, wherein in the optical transmission and reception system, the plurality of reception apparatus comprises: the second reception apparatus which is configured to receive at a side portion, the transmitted second path signal, which is transmitted along the horizontal plane of the transmission apparatus.

The above said method for enabling optical channels, wherein in the optical transmission and reception system, the plurality of reception apparatus comprises: the third reception apparatus which is configured to receive at a bottom portion, the third path signal, which is transmitted along the vertical plane in upwards direction of the transmission apparatus.

The invention further provides a method involving transceiving apparatus for enabling optical channels for high-speed communication between compute systems in a computing environment, wherein the optical channel is a transceiving apparatus, wherein the method comprises the steps of:
- configuring a convergence or divergence area, wherein the convergence or divergence area configured to receive a first plurality of optical signals from a first system in a transmission mode, the convergence or divergence area configured to receive a second plurality of optical signals to be transmitted to a second system in a reception mode;
- configuring a first shift area, wherein the first shift area transmits a first set of optical signals associated with the first plurality of optical signals along a vertical plane in upwards direction, in transmission mode, the first shift area receives a second set of optical signals that is transmitted along a vertical plane in upwards direction and forms a part of the second plurality of optical signals, in reception mode, —configuring a second shift area, wherein the second shift area is configured to transmit a third set of optical signals associated with the first plurality of optical signals along a horizontal plane, in transmission mode, the second shift area is configured receive a fourth set of optical signals that is transmitted along a horizontal plane and forms a part of the second plurality of optical signals, in reception mode,
- configuring a third shift area, wherein the third shift area configured to transmit a fifth set of optical signals associated with the first plurality of optical signals along a vertical plane in downwards direction, in transmission mode, the third shift area configured to receive a sixth set of optical signals that is transmitted along the vertical plane in downwards direction and forms a part of the second plurality of optical signals, in reception mode.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF DRAWINGS

The foregoing and other features of embodiments will become more apparent from the following detailed description of embodiments when read in conjunction with the accompanying drawings. In the drawings, like reference numerals refer to like elements.

In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

DETAILED DESCRIPTION OF THE INVENTION

Accordingly, the present invention describes system(s) and method(s) for enabling optical channels for high-speed communication.

Reference will now be made in detail to the description of the present subject matter, one or more examples of which are shown in figures. Each example is provided to explain the subject matter and not a limitation. Various changes and modifications obvious to one skilled in the art to which the invention pertains are deemed to be within the scope and contemplation of the invention.

In this description, the word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed. Further, in this description "application" may include files with executable content created based on Hardware description language (HDL), where HDL is a specialized computer language used to program electronic and digital logic circuits. The structure, operation and design of the circuits are programmable using HDL. HDL includes a textual description consisting of operators, expressions, statements, inputs, and outputs.

The term "content" may also include files having executable content, such as: object code, scripts, byte code, markup language files, and patches. In addition, "content" referred to herein, may also include files that are not executable in nature, such as documents that may need to be opened or other data files that need to be accessed.

In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). The term "signal" generally is an electromagnetic or electrical current that carries data/information from one system or another system, or from one network to another network. The term "optical signal" refers to data/information transmitted in the form of light signals transmitted from a LASER.

Figure 1:
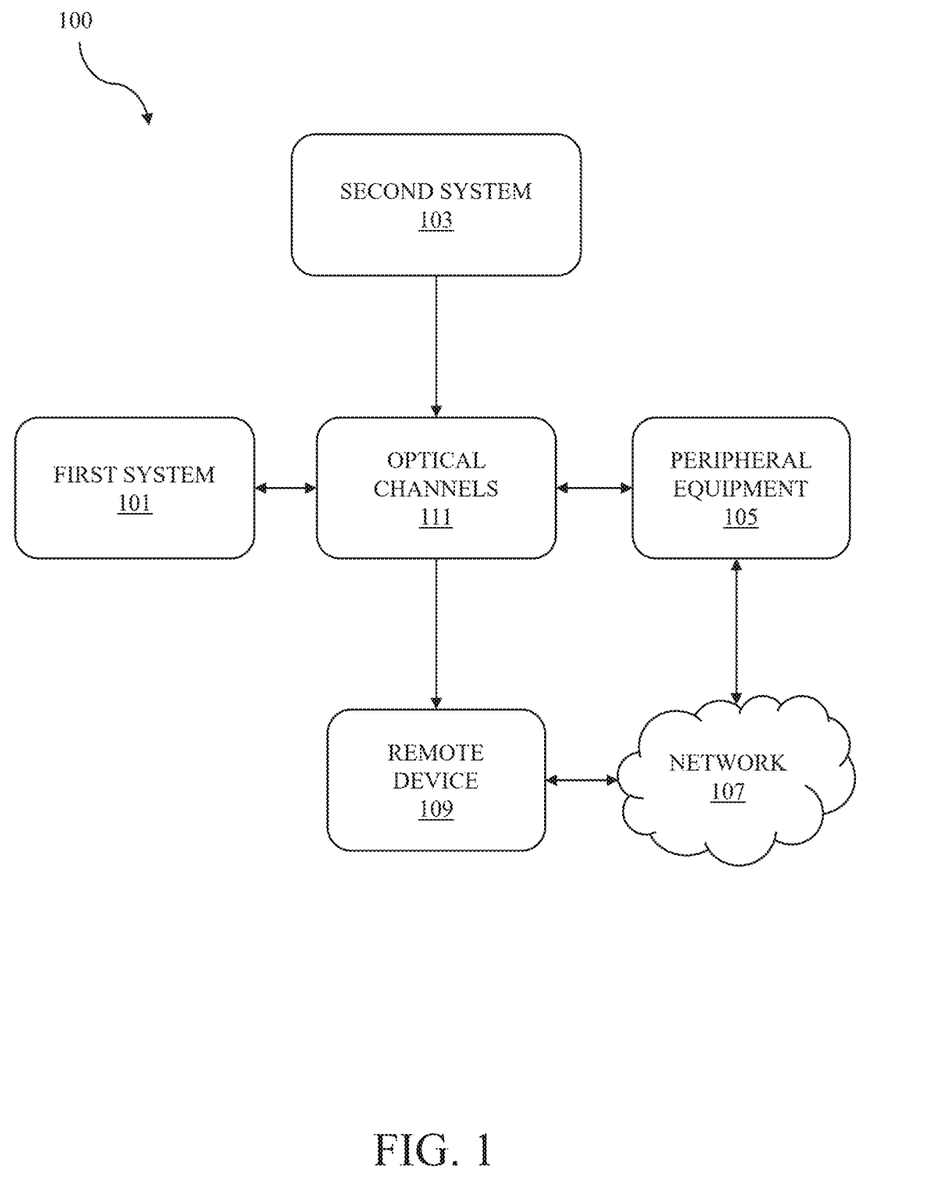
FIG. 1 illustrates a network environment, for enabling optical channels for highspeed communication, according to one embodiment of the invention.

FIG. 1 illustrates a network environment, for enabling an optical channel for highspeed communication between computing systems communicatively connected in the network environment. Referring now to the drawings, FIG. 1 illustrates an environment (100) such as a computing environment for exchange of data/information for communication within which optical channel (111) may be implemented. The environment (100) may include a first system (101), a second system (103), peripheral equipment (105), a network (107), and a remote user device (109) and optical channels (111).

The computing system as described herein may comprise one or more compute systems ("n" numbers) such as first compute system, second compute system, third compute system, fourth compute system, and like upto "n" numbers of compute systems. Thus, the compute system may be a plurality of compute systems communicatively connected within the computing environment. For the description and exemplary illustration of the present invention in paragraphs below, the above said "first compute system" is referred with numeral (101) and the "second compute system" is referred with numeral (103). Further, the first compute system (101) may communicatively be coupled to the second compute system (103) through the optical channels (111). In some example embodiments, the first compute system (101) and the second compute system (103) may also be referred as "system".

In some example embodiments, the network (107) may be coupled with the first compute system (101) or the second compute system (103) or with both the first and second compute systems (101, 103).

Figure 2A:
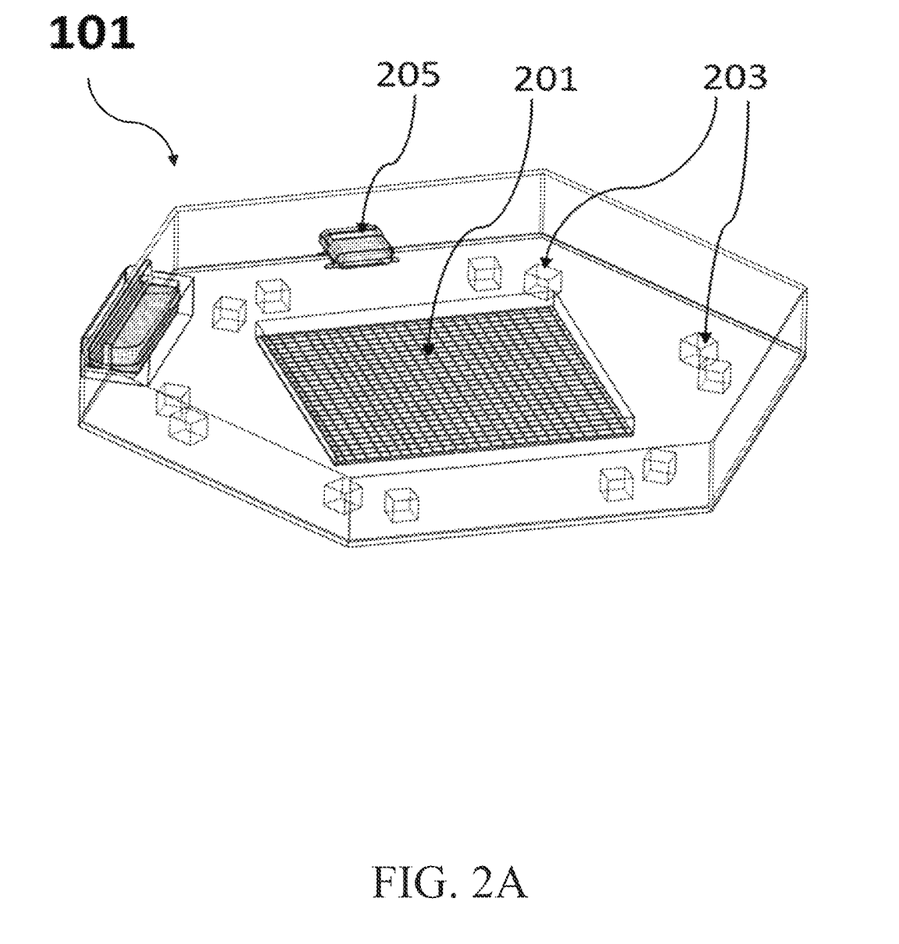
FIGS. 2A-2C illustrate a block diagram of systems used to enable optical channels based high-speed communication, according to one embodiment of the invention.
Figure 2B:
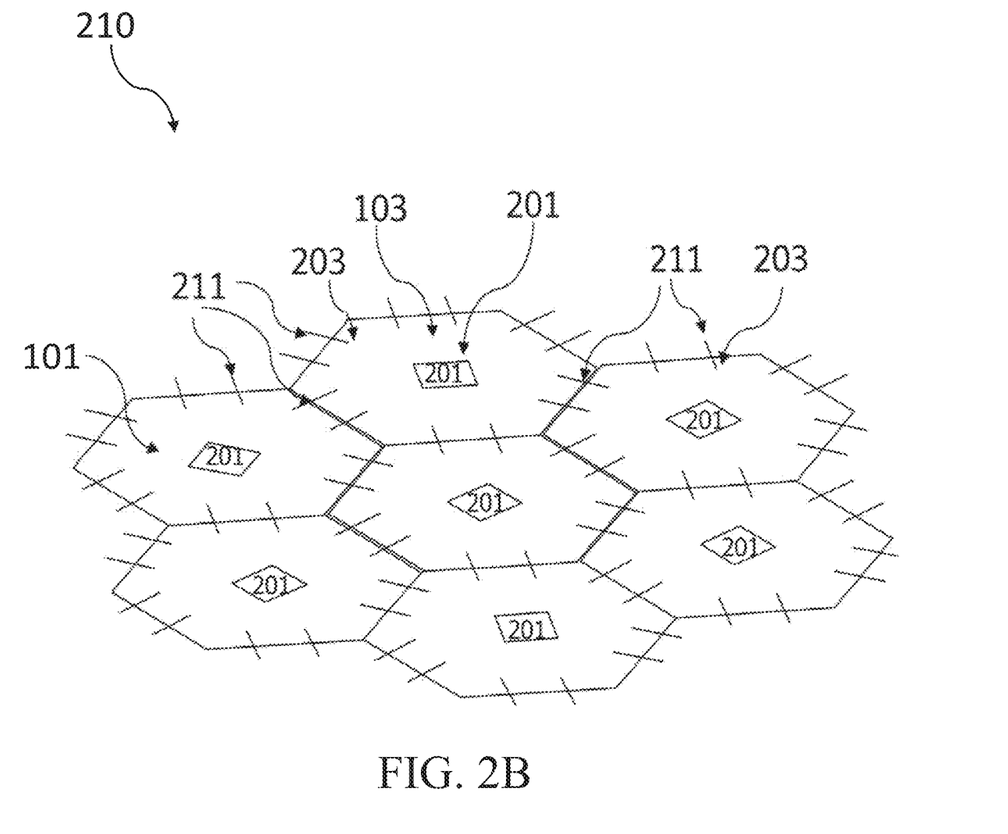
Figure 2C:
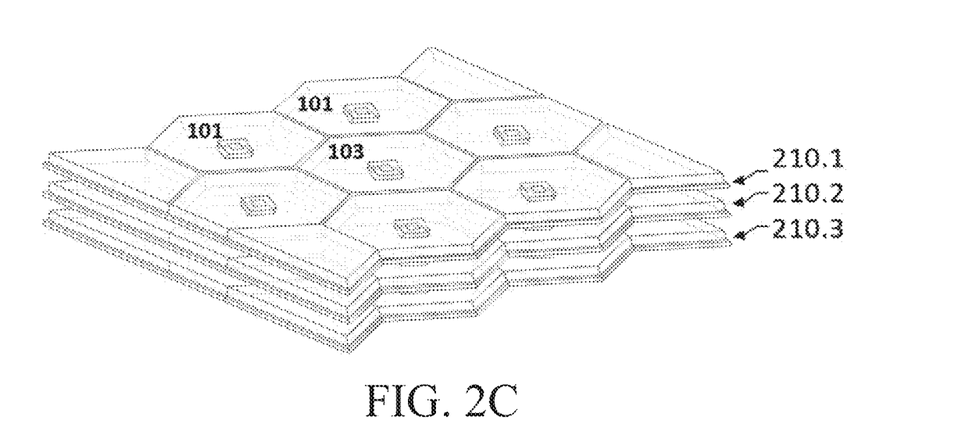

In one embodiment, the compute system (101/103) may be a hexagonal lego as shown and illustrated in FIGS. 2A-2C. In one embodiment, one or more peripheral equipment(s) (105) and/or one or more remote device(s) (109) connected with the network (107) of the environment (100) may be able connect with one or more compute systems (101, 103, . . . n) connected with the network (107) and thus sending/receiving of data/information/signal may be accomplished for communication between the compute systems, peripheral equipments, and remote devices via the network (107) and also via the optical channels (111).

In an example embodiment, the peripheral equipment (105) may receive and/or send data through the optical channels (111) and/or the network (107). In some example embodiments, peripheral devices may include but not limited to keyboard, mouse, touch screen, pen tablet, joystick, musical instrument digital interface (MIDI) keyboard, scanner, digital, camera, video camera, microphone monitor, projector, TV screen, printer, plotter, speakers, external hard drives, media card readers, digital, camcorders, digital mixers, MIDI equipment and the like.

The network (107) may include the Internet or any other network capable of communicating data between devices. Suitable networks may include or interface with any one or more of, for instance, a local intranet, a Personal Area Network (PAN), a Local Area Network (LAN), a Wide Area Network (WAN), a Metropolitan Area Network (MAN), a virtual private network (VPN), a storage area network (SAN), a frame relay connection, an Advanced Intelligent Network (AIN) connection, a synchronous optical network (SONET) connection, a digital TI, T3, E1 or E3 line, Digital Data Service (DDS) connection, Digital Subscriber Line (DSL) connection, an Ethernet connection, an Integrated Services Digital Network (ISDN) line, a dial-up port such as a V.90, V.34 or V.34b is analog modem connection, a cable modem, an Asynchronous Transfer Mode (ATM) connection, or an Fiber Distributed Data Interface (FDDI) or Copper Distributed Data Interface (CDDI) connection. Furthermore, communications may also include links to any of a variety of wireless networks, including Wireless Application Protocol (WAP), General Packet Radio Service (GPRS), Global System for Mobile Communication (GSM), Code Division Multiple Access (CDMA) or Time Division Multiple Access (TDMA), cellular phone networks, Global Positioning System (GPS), cellular digital packet data (CDPD), Research in Motion, Limited (RIM) duplex paging network, Bluetooth radio, or an IEEE 802.11-based radio frequency network. The network 109 can further include or interface with any one or more of an RS-232 serial connection, an IEEE-1394 (Firewire) connection, a Fiber Channel connection, an IrDA (infrared) port, a SCSI (Small Computer Systems Interface) connection, a Universal Serial Bus (USB) connection or other wired or wireless, digital, or analog interface or connection, mesh, or Digi® networking. In some example embodiments, network may further include free space communications.

In an alternative embodiment, dedicated hardware implementations, such as application specific integrated circuits, programmable logic arrays and other hardware devices, can be constructed to implement one or more of the methods described herein. Applications that may include the apparatus of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In an example embodiment, the remote device (109) may be communicatively coupled to the peripheral equipments/devices (105) via the network (107). The remote device (109) may include mobile phone, laptops, desktops, and the like. In some example embodiment, the remote device (109) may receive a plurality notification based on one or more functions associated with the compute system (101 and/or 103).

FIGS. 2A-2C illustrate a block diagram of systems used to enable optical channels based high-speed communication, according to one embodiment of the invention. In some example embodiments, the block diagram of optical channels may also describe construction and assembly of the optical channels (111) that enables high data rate connection between at least one system (101 and/or 103) is described herein. FIG. 2A illustrates the first system (101) of the FIG. 1. In some example embodiments, the first system (101) may comprise a processor (201), one or more communication drivers (203) to generate optical signals and one or more ports (205). In some example embodiments, the processor (201) may be of any type of processor, such as "n-bit processors", where value of n may be 2×, whereas values of x may range from 4 to 8. Processor types other than these, as well as processors that may be developed in the future, are also suitable. The processor may include general processor such as x86, x86-64, ARM, RISC-V, ISA based processors, Digital Signal Processing (DSP) chip, an Application Specific Integrated Circuit (ASIC), Field Programmable Gate Arrays (FPGAs), microcontroller firmware, boot loader or a combination thereof. Mainly, the processor (201) be used for automating the construction and assembly of the optics based compute system (101 and/or 103). Throughout the disclosure the compute system and the optics based compute system may interchangeably be used and may also be referred as the system (101 and/or 103).

Processors suitable for the execution of a computer program include, by way of example, both general and special purpose microprocessors, and any one or more processors of any kind of digital computer. Generally, a processor receives instructions and data from a read only memory or a random-access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a GPS receiver, to name just a few. Computer readable media suitable for storing computer program instructions and data include all forms of non-volatile memory, media, and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc read-only memory (CD-ROM) and digital versatile disc-read only memory (DVD-ROM) disks. The memory may be a non-transitory medium such as a read-only memory (ROM), random-access memory (RAM), flash memory, etc. The processor and the memory can be supplemented by, or incorporated in, special purpose logic circuitry.

One or more programmable processors executing one or more computer programs to perform functions by operating on input data and generating output can perform the processes and logic flows described in the specification. The processes and logic flows can also be performed by, and apparatus can also be implemented as, special purpose logic circuitry, e.g., a field programmable gate array (FPGA) or application specific integrated circuit (ASIC).

In one embodiment, each compute system (101/103) is hexagonal lego having six sides, each side of a lego (101) having capability of signal/data communication to corresponding side of another similar hexagonal lego (103) via one or more optical channels (211) as shown in FIG. 2A. and FIG. 2B. One or more communication drivers (203) are provided in each compute system (101, 103) to generate optical signals. In an example embodiment, as can be seen, the hexagonal lego system (101) of FIG. 2A comprises twelve numbers of communication drivers (203) which enable to generate optical signal from each side of the hexagonal system (101). Optical signal thus generated from one system is then transmitted to another system via one or more optical channels such as (111) of FIG. 1 and (211) of FIG. 2B.

In some example embodiments, the FIG. 2B illustrates a cluster of compute systems (210) having a plurality of compute systems (for example, seven numbers of systems) connected and communicated via a plurality of optical channels (211). As shown, the first compute system (101) and the second compute system (103) are connected using the optical channels (211), which is the same optical channel (111) as shown in FIG. 1. In some example embodiments, other systems shown in the FIG. 2B may be connected using the optical channels (211) as shown in the figure. In some example embodiments, the cluster of systems (210) comprise horizontal connection of other systems as shown in FIG. 2B. In some example embodiments, a plurality of the cluster of compute systems (210) may be placed such as one cluster on the top of other cluster to form a stack (221) of the cluster of compute systems (210) as shown in the FIG. 2C.

Referring FIG. 2C, in an example embodiment it shows a stack (221) which comprises three layers of cluster of compute systems (210) viz. first layer of cluster of compute systems (210.1), second layer of cluster of compute systems (210.2), and third layer of cluster of compute systems (210.3). In some example embodiments, the stack (211) comprises the optical channels (211) to enable communication in the vertical plane. In some example embodiments, the optical channels (111) of the FIG. 1 is same as the optical channels (211) of the FIG. 2B.

In one aspect, the invention provides an optical transmission and reception system for high-speed optical communication, which is the optical channel (111/211), wherein the optical channel comprises:
  (iii) a transmission apparatus—associated with one compute system for transmission of optical signal obtained from the one compute system; and
  (iv) a plurality of reception apparatus—associated with another compute system for reception of optical signal transmitted from said one compute system.

Figure 3A:
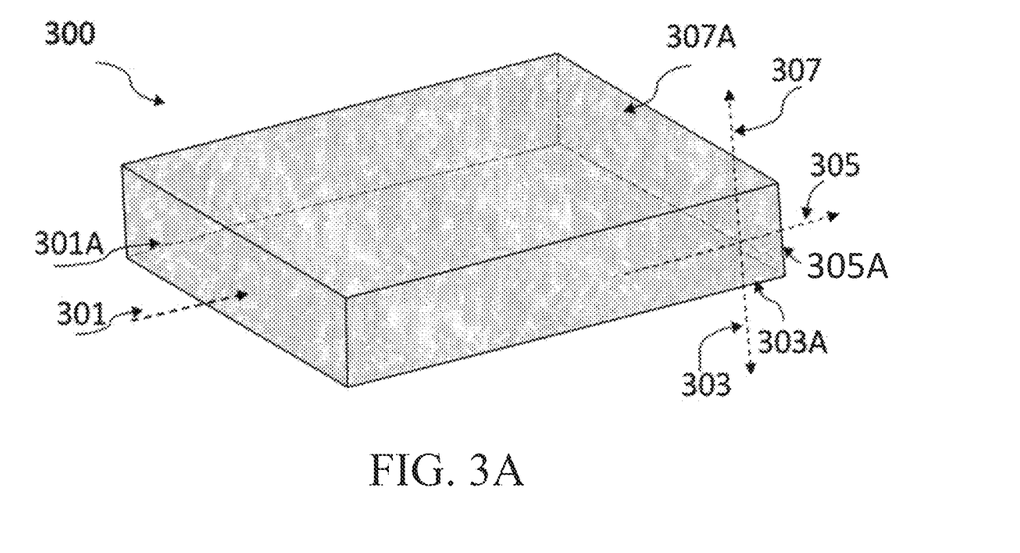
FIGS. 3A-3D illustrate working of optical channels, according to one embodiment of the invention.
Figure 3B:
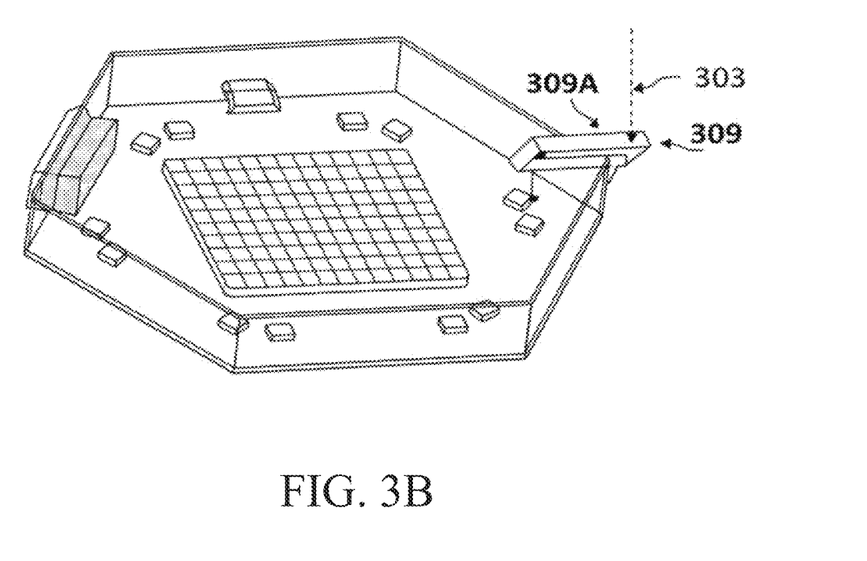
Figure 3C:
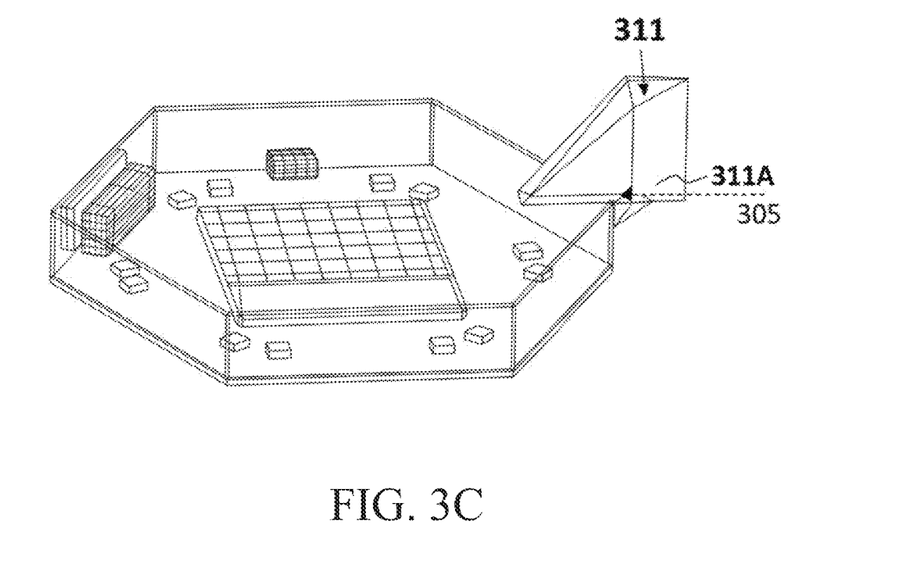
Figure 3D:
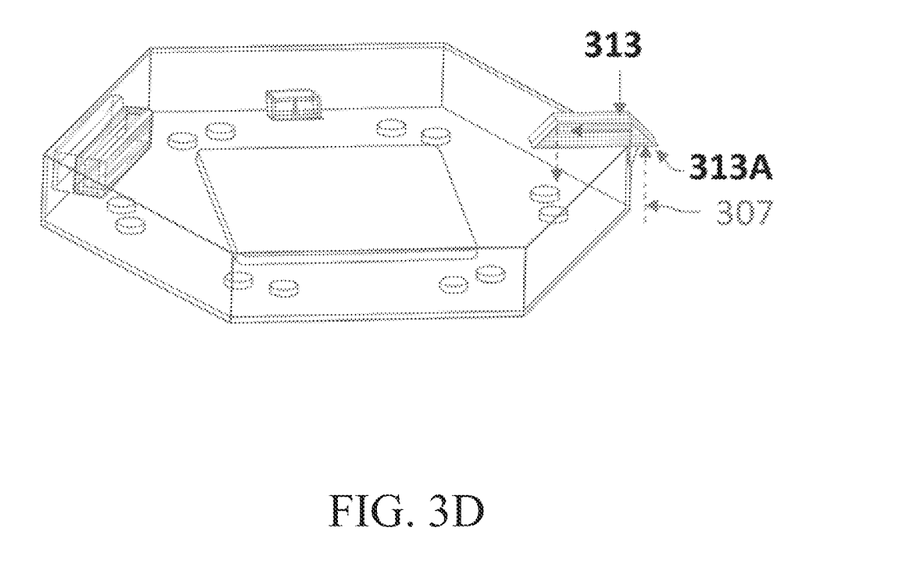

FIGS. 3A-3D illustrate working of the optical channels (111 or 211), according to one embodiment of the invention. FIG. 3A illustrates a transmission apparatus (300). In some example embodiments, the transmission apparatus (300) may be a beam splitter, which is an optical device which splits an incident light beam into two or more light beams. In one example embodiment, among the plurality of compute systems shown in the FIG. 2B, consider the first compute system (101) as a transmitting system and the second compute system (103) as the receiving system, wherein systems (101, 103) are connected via optical channels (111 or 211). The transmission apparatus (300) of optical channel (111 or 211) is attached to the first system (101) such that it is coupled with the optical driver (203) as shown in FIGS. 2A-2B. As shown in figure, the first compute system (101) is a hexagonal lego having six sides with a programmable processor (201) centrally placed within the compute system (101), and a plurality of optical communication drivers (203) are provided surrounding the first processor (201). Similar to first compute system (101), the second compute system (103) also comprises a plurality of optical communication drivers (203) surrounding the second programmable processor (201). The transmission apparatus (300) obtains one or more optical signals (301) from the first system (101) generated by the optical communication driver (203) and then the transmission apparatus (300) generates one or more path signals. The generated path signals are then transmitted in one or more directions. In one example embodiment, the transmission apparatus (300) receives optical signal generated by the optical communication driver (203) of the first system (101) via a first receiving side (301A), wherein one of the generated path signals may be first path signal (303) transmitted along the vertical plane in downwards direction (FIG. 3B). In one example embodiment, one of the generated path signals may be second path signal (305) transmitted along the horizontal plane (FIG. 3C). In one example embodiment, one of the generated path signals may be third path signal (307) transmitted along the vertical plane in upwards direction (FIG. 3D).

In one example embodiment, FIG. 3B illustrates a computing environment (100) wherein a compute system in the stack (221) is placed below the first compute system (101) and a first reception apparatus (309) associated with the system in the stack (221) is placed below the first compute system (101), wherein the first reception apparatus (309) associated with the system in the stack (221) is configured to receive the first path signal (303). The first reception apparatus (309) comprises a top portion (309A) which is configured to receive the first path signal (303), which is transmitted along the vertical plane in downwards direction of the transmission apparatus (300). In one example embodiment, FIG. 3C illustrates computing environment (100) wherein the second compute system (103) is placed next to the first compute system (101), and a second reception apparatus (311) associated with the second compute system (103) is configured to receive the second path signal (305). The second reception apparatus (311) comprises a side portion (311A) which is configured to receive the transmitted second path signal (305), which is transmitted along the horizontal plane of the transmission apparatus (300).

In one example embodiment, FIG. 3D illustrates computing environment (100) wherein a compute system in the stack (221) is placed above the first compute system (101) and a third reception apparatus (313) associated with the system in the stack (221) is placed above the first compute system (101), wherein the third reception apparatus (311) associated with the system in the stack (221) is configured to receive the third path signal (307). The third reception apparatus (313) comprises a bottom portion (313A) which is configured to receive the third path signal (307), which is transmitted along the vertical plane in upwards direction of the transmission apparatus (300).

In one example embodiment, the transmission apparatus (300), and each of the plurality of the reception apparatus (309, 311, and 313) are glass prisms having refractive index same as air. Further, the glass prisms comprise an optical coating to modulate intensity of the at least one optical signal received or to modulate intensity of the one or more path signals. The glass prisms operate under the principles of simple optics such that in the transmission apparatus (300) reflection is achieved at second side (303A), and the fourth side (307A), at an angle of 45 degree. At the third side (305A), there is no reflection observed and the one or more path signals are passed directly. Form factor of the prisms are in the range of micrometers such that prisms are firmly attached to the first system (101) or the second system (103), which are also in the range of tens of micro-meters. In some example embodiments, the prism may comprise a rectangular surface of 5.55 mm is length with 0.05 mm of tolerance and the prism may comprise a rectangular surface of 3 mm is length with 0.05 mm of tolerance. Further, the prism may comprise a rectangular surface with 0.55 mm each side with 0.05 mm of tolerance. In some example embodiments, each of the prisms are made of combination of one or more rectangular and triangular surfaces. In some example embodiments, the at least one optical signal (301) received at a first side (301A) is transmitted as the first path signal (303) at the second side (303A), the second path signal (305) at the third side (305A), and the third path signal (307) at the fourth side (307A), are in the ratio of 30% to 28% to 14% respectively. The remaining are part of loses. It may also be observed that the path signals are firstly modulated by prism based on reflection and further subjected to intensity modulation by the optical coating at the transmitter side. At the receiver side, the received signals are intensity modulated by the optical coating then subjected to reflection.

Figure 4:
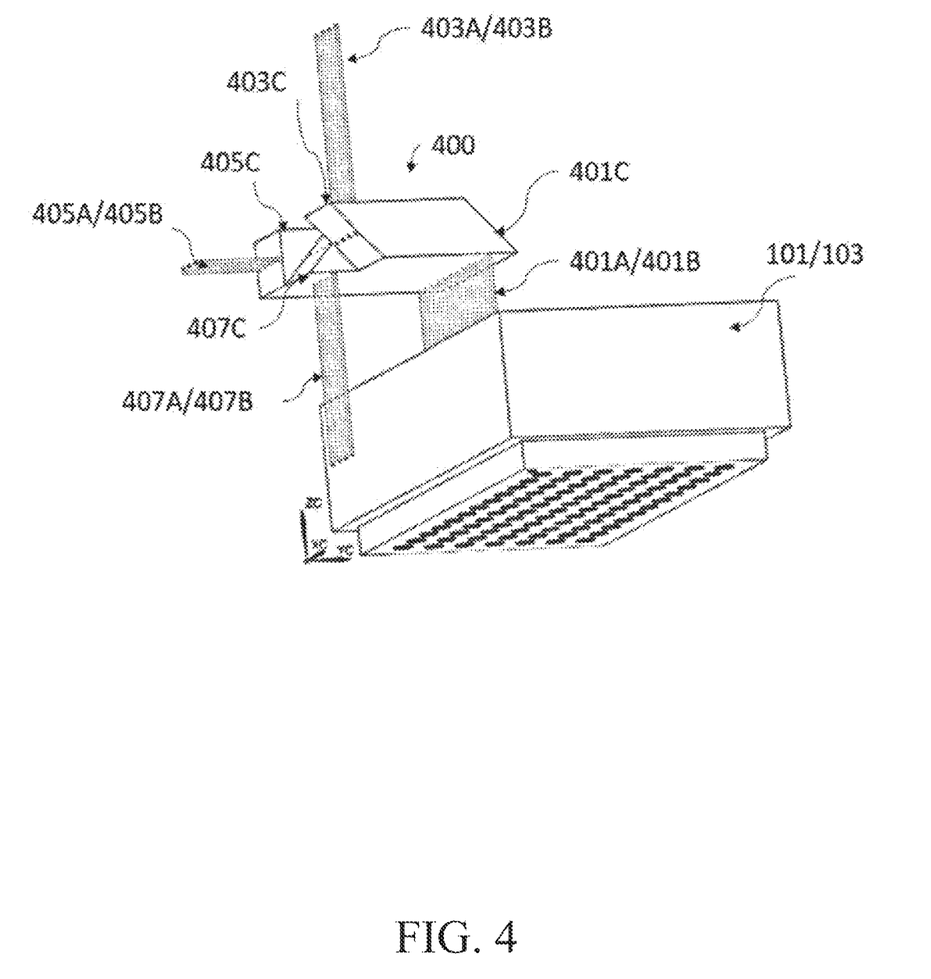
FIG. 4 illustrates a universal transmission and reception apparatus and coupling of the universal transmission and reception apparatus according to one embodiment of the invention.

In another aspect, the invention provides a system for enabling optical channels (111) for high-speed communication between compute systems (101, 103, . . . n) in a computing environment (100), wherein the optical channel (111) is a transceiving apparatus (400) as shown in FIG. 4 which comprises: a convergence or divergence area (401C), a first shift area (403C), a second shift area (405C), a third shift area (407C).

FIG. 4 illustrates a transceiving apparatus (400) and coupling of the universal transmission and reception apparatus (400) according to one embodiment of the invention. In some example embodiments, the universal transceiving apparatus (400) may also be referred as universal transmission and reception apparatus. Unlike the system described through FIGS. 3A to 3D, transceiving apparatus (400)

performs multi-directional transmission and reception using a single apparatus with less than 10% loss.

In some example embodiments, the first compute system (101) transmits a first plurality of optical signals (401A), generated from LASERs towards a convergence or divergence area (401C). For example, a twelve channel LASER transmits twelve optical signals towards the convergence or divergence area (401C). At the convergence or divergence area (401C), the first plurality of signals (401A) is directed towards a first shift area (403C), a second shift area (405C), and a third shift area (407C) based on direction of transmission. At the first shift area (403C), a first set of optical signals (403A) associated with the first plurality of optical signals (401A) is transmitted along a vertical plane in upwards direction. Also, at the second shift area (405C), a third set of optical signals (405A) associated with the first plurality of optical signals (401A) is transmitted along a horizontal plane. Further, at the third shift area (407C), a fifth set of optical signals (407A) associated with the first plurality of optical signals (401A) is transmitted along a vertical plane in downwards direction. For example, the transmitted twelve optical signals towards the convergence or divergence area (401C) are divided into three sets of four optical signals each along a vertical plane in upwards direction, a horizontal plane, and a vertical plane in downwards direction.

In some example embodiments, a second system (103) receives a second plurality of optical signals (401B), directed from the convergence or divergence area (401C). For example, a twelve-channel photo electric diode receives twelve optical signals directed from the convergence or divergence area (401C). At the convergence or divergence area (401C), the second plurality of signals (401B) is generated based on the signals obtained from the first shift area (403C), the second shift area (405C), and the third shift area (407C). At the first shift area (403C), a second set of optical signals (403B) associated with the second plurality of optical signals (401B) is received along the vertical plane in upwards direction. Also, at the second shift area (405C), a fourth set of optical signals (405B) associated with the second plurality of optical signals (401B) is received along the horizontal plane. Further, at the third shift area (407C), a sixth set of optical signals (407B) associated with the second plurality of optical signals (401B) is received along the vertical plane in downwards direction. For example, at the convergence or divergence area (401C), three sets of four optical signals each is received along a vertical plane in upwards direction, a horizontal plane, and a vertical plane in downwards direction. The three sets of four optical signals each is converged and received by a photoelectric diode as a set of twelve optical signals.

Throughout the disclosure, the Optical Channels (111) shown in FIG. 1/Optical Channels (211) shown in FIG. 2 may be the optical transmission and reception system shown in FIG. 3 or the transceiving system (400) shown in FIG. 4.

In some example embodiments, the transceiving apparatus (400) is formed by combination of multiple prisms in one single unit. At the convergence or divergence area (401C), the transceiving apparatus (400) receives the first plurality of optical signals (401A) or receives the second plurality of optical signals (40 IB) at a 45-degree angle. Similarly, at the first shift area (403C), at the second shift area (405C), and at third shift area (407C), the multiple optical signals transmitted or received are at 45-degree angle. The combination of multiple prisms in one single unit ensures transmission and reception of optical signals at 90% efficiency. In some example embodiments, the combination of multiple prisms may comprise an optical coating to modulate intensity of the optical signals. In some example embodiments, the transceiving apparatus (400) is firmly affixed to the first system (101) or to the second system (103).

Throughout the disclosure, the convergence or divergence area indicates that an area where optical signals converge or diverge from a group of signals. The shift area includes an area where the optical signal is subjected to a phase shift/reflection. Even at the convergence or divergence area, the optical signals are subjected to a phase shift/reflection. Since, the transceiving apparatus (400), uses free space optics, all overheads of optical fibers may be eliminated.

In another aspect, the invention further provides methods for enabling the optical channels (111/211) as described above.

Accordingly, a method for enabling optical channels (111/211) for high-speed communication between compute systems (101, 103, . . . n) in a computing environment (100) is described, wherein the optical channel (111/211) is an optical transmission and reception system, wherein the optical transmission and reception system, comprises:
(i) a transmission apparatus (300)—to be associated with one compute system to transmit optical signal; and
(ii) a plurality of reception apparatus (309, 311, 313)—to be associated with another compute system to receive the transmitted optical signal; wherein the method comprises the steps of 501, 503, 505 as described below and as shown in flow chart of FIG. 5.

FIG. 5 illustrates a flow chart for enabling optical channels for high-speed communication, according to one embodiment of the invention.

In accordance with an embodiment, at step 501 of the method, the optical channels (111) may be configured to obtain/receive at least one optical signal from a first compute system (101).

In accordance with an embodiment, at step 503 of the method, the optical channels (111) may be configured to generate and transmit one or more path signals using a transmission apparatus (300).

The transmission apparatus (300) of the above said method includes, a first side (301A), configured to receive at least one optical signal (301), wherein, the received at least one optical signal (301) is converted into one or more path signal (303, 305, 307) using the first side (301A) of the transmission apparatus (300).

The transmission apparatus (300) of the above said method includes, a second side (303A), configured to transmit a first path signal (303) along a vertical plane in downwards direction of the transmission apparatus (300).

The transmission apparatus (300) of the above said method includes, a third side (305A), configured to transmit a second path signal (305) along a horizontal plane of the transmission apparatus (300). The transmission apparatus (300) of the above said method includes, a fourth side (307A), configured to transmit a third path signal (307) along a vertical plane in upwards direction of the transmission apparatus (300).

In accordance with an embodiment, at step 505 the optical channels (111) may be configured to receive respective one or more path signals using a reception apparatus (309/311/313) associated with a second compute system (103).

In this step, one or more path signal (303, 305, 307) are received using one or more reception apparatus (309, 311, 313) respectively, associated with a second system (103) wherein, one or more reception apparatus (309, 311, 313), is/are configured to receive the first path signal (303), the second path signal (305), the third path signal (307) respectively, which are transmitted from the transmission apparatus (300) of the optical channel (111).

The structural construction, assembly, and working of above said transmission apparatus (300) and reception apparatus (309, 311, 313) used in above said method of FIG. 5 are as described above with reference to FIGS. 3A-3D.

In another aspect, the invention provides a method for enabling optical channels (111) for high-speed communication between compute systems (101, 103, . . . n) in a computing environment (100), wherein the optical channel (111) is a transceiving apparatus (400) as shown in FIG. 4 and as described above with reference to FIG. 4. In one embodiment, the method of enabling the optical channel (transceiving apparatus) comprises below method steps: configuring a convergence or divergence area (401C), wherein the convergence or divergence area (401C) configured to receive a first plurality of optical signals (401A) from a first system (101) in a transmission mode, the convergence or divergence area (401C) configured to receive a second plurality of optical signals (401B) to be transmitted to a second system (103) in a reception mode; configuring a first shift area (403C), wherein the first shift area (403C) transmits a first set of optical signals (403A) associated with the first plurality of optical signals (401A) along a vertical plane in upwards direction, in transmission mode, the first shift area (403C) receives a second set of optical signals (403B) that is transmitted along a vertical plane in upwards direction and forms a part of the second plurality of optical signals (40 IB), in reception mode, configuring a second shift area (405C), wherein the second shift area (405C) is configured to transmit a third set of optical signals (405A) associated with the first plurality of optical signals (401A) along a horizontal plane, in transmission mode, the second shift area (405C) is configured receive a fourth set of optical signals (405B) that is transmitted along a horizontal plane and forms a part of the second plurality of optical signals (40 IB), in reception mode, configuring a third shift area (407C), wherein the third shift area (407C) configured to transmit a fifth set of optical signals (407A) associated with the first plurality of optical signals (401A) along a vertical plane in downwards direction, in transmission mode, the third shift area (407C) configured to receive a sixth set of optical signals (407B) that is transmitted along the vertical plane in downwards direction and forms a part of the second plurality of optical signals (401B), in reception mode.

The many features and advantages of the invention are apparent from the detailed specification, and thus, it is intended by the appended claims to cover all such features and advantages of the invention which fall within the true scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

We claim:

1. A system for enabling a plurality of optical channels for high-speed communication between a plurality of compute systems in a computing environment, the system comprising:
    the plurality of compute systems; and
    the plurality of optical channels, wherein
        each optical channel of the plurality of optical channels corresponds to an optical transmission and reception system,
        the optical transmission and reception system comprises:
            (i) a transmission apparatus associated with a first compute system of the plurality of compute systems, wherein the transmission apparatus is configured to receive at leas on optical signal from the first compute system; and
            (ii) a plurality of reception apparatuses associated with a second compute system of the plurality of compute systems, wherein the plurality of reception apparatuses is configured to receive the at least one optical signal from the first compute system via the transmission apparatus,
        the transmission apparatus includes:
            a first side configured to:
                receive the at least one optical signal from the first compute system; and
                convert the at least one optical signal into one or more path signals, wherein the one or more path signals include a first path signal, a second path signal, and a third path signal;
            a second side configured to transmit the first path signal along a vertical plane in a downwards direction of the transmission apparatus;
            a third side configured to transmit the second path signal along a horizontal plane of the transmission apparatus; and
            a fourth side configured to transmit the third path signal along the vertical plane in an upward direction of the transmission apparatus, and
        the plurality of reception apparatuses associated with the second compute system is configured to receive each of the first path signal, the second path signal, and the third path signal generated and transmitted from the transmission apparatus associated with the first compute system.

2. The system as claimed in claim 1, wherein the plurality of reception apparatuses comprises a first reception apparatus configured to receive, at a top portion of the first reception apparatus, the first path signal which is transmitted along the vertical plane in the downward direction of the transmission apparatus.

3. The system as claimed in claim 1, wherein the plurality of reception apparatuses comprises a second reception apparatus configured to receive, at a side portion of the second reception apparatus, the second path signal which is transmitted along the horizontal plane of the transmission apparatus.

4. The system for enabling optical channels as claimed in claim 1, wherein the plurality of reception apparatuses comprises a third reception apparatus configured to receive, at a bottom portion of the third reception apparatus, the third path signal which is transmitted along the vertical plane in the upward direction of the transmission apparatus.

5. The system as claimed in claim 1, where
    the plurality of computer systems in the computing environment comprises one or more modular compute systems,
    each modular compute system of the one or more modular compute systems comprises a reconfigurable or programmable processor, and
    the plurality of optical channels connects a first modular compute system of the one or more modular compute systems with a second modular compute system of the one or more modular compute systems for transmission and reception of optical signals.

6. A system for enabling an optical channel for high-speed communication between a plurality of compute systems in a computing environment, the system comprising:

the plurality of compute systems; and
the optical channel, wherein
the optical channel corresponds to a transceiving apparatus,
the transceiving apparatus comprises:
a convergence or divergence area, wherein
in a transmission mode, the convergence or divergence area is configured to receive a first plurality of optical signals from a first compute system of the plurality of compote systems, and
in a reception mode, the convergence or divergence area is configured to receive a second plurality of optical signals from a second compute system of the plurality of compute systems;
a first shift area, wherein;
in the transmission mode, the first shift area is configured to transmit a first set of optical signals of the first plurality of optical signals along a vertical plane in an upward direction, and
in the reception mode, the first shift area is configured to receive a second set of optical signals of the second plurality of optical signals along the vertical plane in the upward direction;
a second shift area, wherein
in the transmission mode, the second shift area is configured to transmit a third set of optical signals of the first plurality of optical signals along a horizontal plane, and
the reception mode, the second shift area is configured to receive a fourth set of optical signals of the second plurality of optical signals along the horizontal plane; and
a third shift area, wherein
in the transmission mode, the third shift area is configured to transmit a fifth set of optical signals of the first plurality of optical signals along the vertical plane in a downward direction, and
in the reception mode, the third shift area is configured to receive a sixth set of optical signals of the second plurality of optical signals along the vertical plane in the downwards direction.

7. The system as claimed in claim 6, wherein
the plurality of compute systems in the computing environment comprises one or more modular compute systems,
each modular compute system of the one or more modular compute systems comprises a reconfigurable or programmable processor, and
the optical channel connects a first modular compute system of the one or more modular compute systems with a second modular compute system of the one or more modular compute systems for transmission and reception of optical signals.

8. The system as claimed in claim 7, wherein
each modular compute system of the one or more modular compute systems comprises one or more optical communication drivers connected with the optical channel,
each optical communication driver of the r ore optical communication drivers is configured to generate at least one optical signal from a corresponding modular compute system of the one or more modular compute systems, and
the generated at least one optical signal is transmitted via the optical channel to the another second modular compute system.

9. The system as claimed in claim 7, wherein the one or more modular compute systems are in a cluster arrangement with horizontal interconnection of modular compute systems for enabling the communication via the optical channels in the horizontal plane.

10. The system as claimed in claim 9, wherein
the one or more modular compute systems are in a stacked that includes a plurality of layers, wherein
each layer of the plurality of layers corresponds to the cluster arrangement of modular compute systems,
in the stacked arrangement, the plurality of layers has vertical interconnection of compute systems for enabling the communication via the optical channel in the vertical plane.

11. A method for enabling a plurality of optical channels for high-speed communication between a plurality of compute systems in a computing environment, the method comprising:
in a system that comprises:
the plurality of compute systems; and
the plurality of optical channels, wherein
each optical channel of the plurality of optical channels corresponds to an optical transmission and reception system,
the optical mission and reception system comprises:
(i) a transmission apparatus associated with a first compute system of the plurality of compute systems, wherein the transmission apparatus is configured to receive at least one optical signal from the first compute system; and
(ii) a plurality of reception apparatuses associated with a second compute system of the plurality of compute systems, wherein the plurality of reception apparatuses is configured to receive the at least one optical signal from the first compute system via the transmission apparatus, and
the transmission apparatus includes a first side, a second side, a third side, and a fourth side:
receiving, by the first side of the transmission apparatus, the at least one optical signal from the first compute system;
generating, by the first side of the transmission apparatus, one or more path signals based on the at least one optical signal, wherein the one or more path signals include a first path signal, a second path signal, and a third path signal;
transmitting, by the second side of the transmission apparatus, by the third side of the transmission apparatus, and by the fourth side of the transmission apparatus, the generated one or more path signals, wherein
the second side is configured to transmit the first path signal along a vertical plane in a downward direction of the transmission apparatus,
the third side is configured to transmit the second path signal along a horizontal plane of the transmission apparatus, and
the fourth side is configured to transmit the third path signal along the vertical plane in an upward direction of the transmission apparatus; and
receiving, by the plurality of reception apparatuses, the one or more path signals, wherein the plurality of apparatuses is configured to receive each of the first path signal, the second path signal, the third path signal, which are transmitted from the transmission apparatus.

12. The method as claimed in claim 11, wherein the plurality of reception apparatuses comprises a first reception apparatus configured to receive, at a top portion of the first reception apparatus, the first path signal which is transmitted along the vertical plane in the downward direction of the transmission apparatus.

13. The method as claimed in claim 11, wherein the plurality of reception apparatuses comprises a second reception apparatus configured to receive, at a side portion of the second apparatus, the second path signal, which is transmitted along the horizontal plane of the transmission apparatus.

14. The method as claimed in claim 11, wherein the plurality of reception apparatuses comprises a third reception apparatus configured to receive, at a bottom portion of the third reception apparatus, the third path signal which is transmitted along the vertical plane in the upward direction of the transmission apparatus.

15. A method for enabling an optical channel for high-speed communication between a plurality of compute systems in a computing environment, wherein
the method is executed in a system,
the system comprises:
the plurality of compute systems; and
the optical channel,
the optical channel corresponds to a transceiving apparatus,
the transceiving apparatus comprises a convergence or divergence area, a first shift area, a second shift area, a third shift area,
in a transmission mode, the method comprises:
receiving, by the convergence or divergence area, a first plurality of optical signals from a first compute system of the plurality of compute systems;
transmitting, by the first shift area, a first set of optical signals of the first plurality of optical signals along a vertical plane in an upward direction;
transmitting, by the second shift area, a third set of optical signals of the first plurality of optical signals along a horizontal plane; and
transmitting, by the third shift area, a fifth set of optical signals of the first plurality of optical signals along the vertical plane in a downward direction, and in a reception mode, the method comprises:
receiving by the first shift area, a second set of optical signals from a second compute system of the plurality of computer systems, wherein the second set of optical signals are received along the vertical plane in the upward direction;
receiving, by the second shift area, a fourth set of optical signals from the second compute system, wherein the fourth set of optical signals are received along the horizontal plane;
receiving, by the third shift area, a sixth set of optical signals from the second compute system, wherein the sixth set of optical signals received along the vertical plane in the downward direction; and
transmitting, by the convergence or divergence area, a second plurality of optical signals that includes:
the second set of optical signals,
the fourth set of optical signals, and
the sixth set of optical signals.

* * * * *